United States Patent [19]
Zieve

[11] Patent Number: 5,699,599
[45] Date of Patent: Dec. 23, 1997

[54] MULTIPLE AXIS YOKE FOR LARGE SCALE WORKPIECE ASSEMBLY SYSTEMS

[76] Inventor: Peter B. Zieve, 5766 27th Ave. NE., Seattle, Wash. 98105

[21] Appl. No.: 627,593

[22] Filed: Apr. 4, 1996

[51] Int. Cl.[6] .................................................. B23B 11/00
[52] U.S. Cl. .................... 29/34 B; 29/26 A; 29/243.53; 29/525.2; 227/51; 227/110
[58] Field of Search .................... 29/34 B, 33 R, 29/34 R, 26 A, 243.53, 525.2, 243.54; 227/51, 110

[56] References Cited

U.S. PATENT DOCUMENTS

| | | | |
|---|---|---|---|
| 3,534,896 | 10/1970 | Speller et al. | 227/51 |
| 4,658,485 | 4/1987 | Yang | 29/26 A |
| 4,864,702 | 9/1989 | Speller, Sr. et al. | 29/34 B |
| 4,885,836 | 12/1989 | Bonomi et al. | 29/524.1 |
| 4,936,497 | 6/1990 | Ordelt | 227/110 |
| 4,967,947 | 11/1990 | Sarh | 227/51 |
| 5,027,490 | 7/1991 | Roberts et al. | 29/34 B |
| 5,033,174 | 7/1991 | Zieve | 29/34 B |
| 5,154,643 | 10/1992 | Catania et al. | 29/34 B |
| 5,231,747 | 8/1993 | Clark et al. | 29/243.53 |
| 5,314,397 | 5/1994 | Mills et al. | 29/26 A |
| 5,477,597 | 12/1995 | Catania et al. | 29/34 B |

*Primary Examiner*—Daniel W. Howell
*Assistant Examiner*—Christopher Kirkman
*Attorney, Agent, or Firm*—Jensen & Puntigam, P.S.

[57] ABSTRACT

The yoke assembly is C-shaped, comprising two downwardly depending leg portions and an intermediate portion. Each leg of the yoke is supported for movement of the yoke in an X coordinate direction and a Y coordinate direction. The yoke is further supported about two spaced two-axis pivot point assemblies such that the yoke can move rotationally about the Y axis and about the X axis. The pivot points and the tool point for the tools on the yoke used to accomplish the assembly operations remain in registry during movement of the yoke member.

21 Claims, 8 Drawing Sheets

MULTIPLE AXIS YOKE FOR LARGE SCALE WORKPIECE ASSEMBLY SYSTEMS

TECHNICAL FIELD

This invention relates generally to large scale workpiece assembly systems, such as those used to assemble commercial aircraft wings, and more particularly concerns a yoke assembly which is a part of such an assembly system, used to accomplish particular operations such as drilling, riveting, and insertion of bolts.

BACKGROUND OF THE INVENTION

U.S. Pat. No. 5,033,174, owned by the owner of the present invention, is also directed towards a yoke assembly which is used for large scale assembly or fastening operations. In the '174 patent, the yoke extends over the top of the workpiece with the tools for accomplishing the assembly/fastening operations positioned on the lower surfaces of the two depending leg portions of the yoke. The '174 yoke can be moved in the conventional X and Y coordinate axes, and may also be rotated about the X axis (referred to herein as rotation in the A direction) and about the Y axis (referred to herein as rotation in the B direction).

The '174 yoke has a number of advantages over previous structures, including ease of control and maneuverability. It is relatively easy with such an apparatus to maintain the tools in alignment, which is quite important, and in general the yoke is structurally simpler than previous apparatuses, as well as being less expensive and smaller.

However, in certain situations, the '174 yoke structure has some disadvantages. The yoke tends to wobble during fast successive movements, and rotation of the yoke in the A or B direction tends to have some effect on the X and Y position of the yoke. This "coupling" effect between the A and B axes of rotation of the yoke and the X and Y position of the yoke is undesirable, particularly in those situations where positional accuracy for the tools is important.

In addition to the above-described yoke assembly, there are other known arrangements for accomplishing large-scale fastening operations such as aircraft wing assembly. U.S. Pat. No. 4,885,836 discloses two opposing five-axis robots, which are positioned on each side of the part being assembled. The robots are used to align the opposing heads of the apparatus containing the tools as well to align the tool heads to the workpiece.

U.S. Pat. No. 4,864,702 teaches the use of a square frame which functions similar to a yoke. In this arrangement, opposing tool heads are attached to opposing sides of the frame. The tool heads are independently rotated by rotary actuators.

U.S. Pat. No. 4,955,119 shows a yoke attached to one end of a robot arm. This arrangement, however, while successful in certain applications, is subject to stability concerns and requires a large robot for even the smallest applications.

U.S. Pat. No. 4,720,897 shows a well-known C-frame riveting system. In this arrangement, the opposing legs of the yoke are positioned in a horizontal configuration, with the riveting system being positioned along a vertical axis. Hydraulic pressure is used to accomplish the actual riveting. Such systems, however, are extremely large, heavy and expensive.

Two other known systems are believed to be generally relevant to the present invention. In one arrangement, shown in Fastec Publication No. AD89-646 (in particular FIG. 15), a yoke is moved in the X and Y coordinate directions with the workpiece being mounted on a three-axis positioner so that the part is rotated along selected axes instead of the yoke.

The other system, which is in use, is a variation of that shown in the '897 patent noted above, involving a C-frame riveter positioned on a carriage which moves the yoke. The carriage provides the X, Y and Z direction movement for the yoke. The yoke is mounted on the carriage so that it has a B direction movement. Movement in the A direction (about the X axis) is provided by elements within the yoke itself.

In all of the above references, including the '174 patent, a significant tradeoff is made between stability and control of precise movement on the one hand, and size, weight and cost on the other.

Hence, it would be advantageous if a system could be developed which has the advantages of cost, simplicity and size of the apparatus in the '174 patent, but with significantly improved stability and control.

DISCLOSURE OF THE INVENTION

Accordingly, the present invention is a yoke assembly for large-scale assembly systems, comprising: a yoke member comprising two depending leg portions and an intermediate portion; tool means for accomplishing assembly operations secured to the depending leg portions of the yoke, wherein the tool means defines a tool point for contact with a workpiece being assembled; and means supporting each leg of the yoke member at separate pivot points such that the yoke assembly moves longitudinally in an X axis direction and vertically in a Y axis direction, and rotates substantially about at least one of (a) the Y axis and (b) the X axis.

BEST MODE FOR CARRYING OUT THE INVENTION

Figure 1:
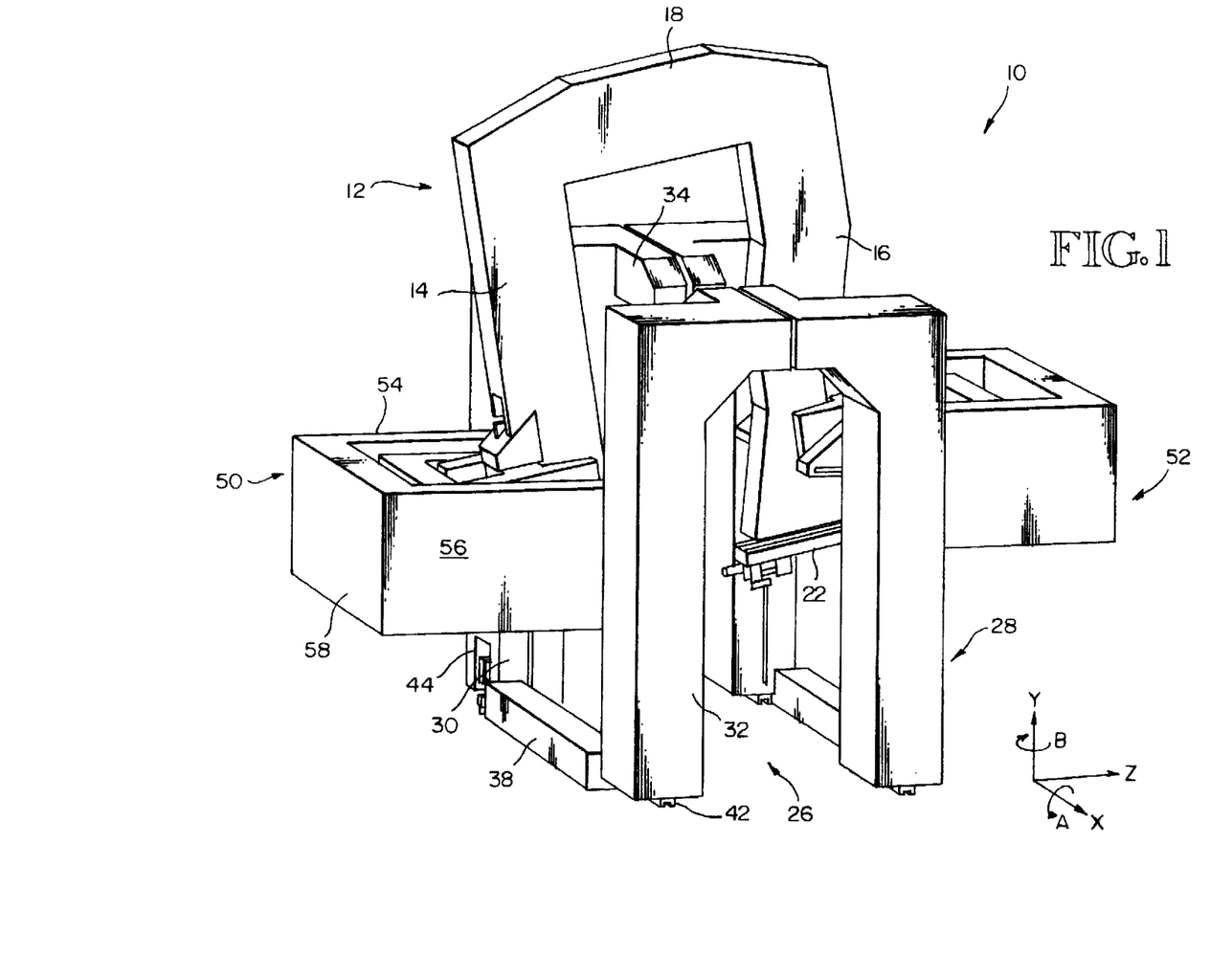
FIG. 1 shows the yoke assembly apparatus of the present invention.
Figure 7:
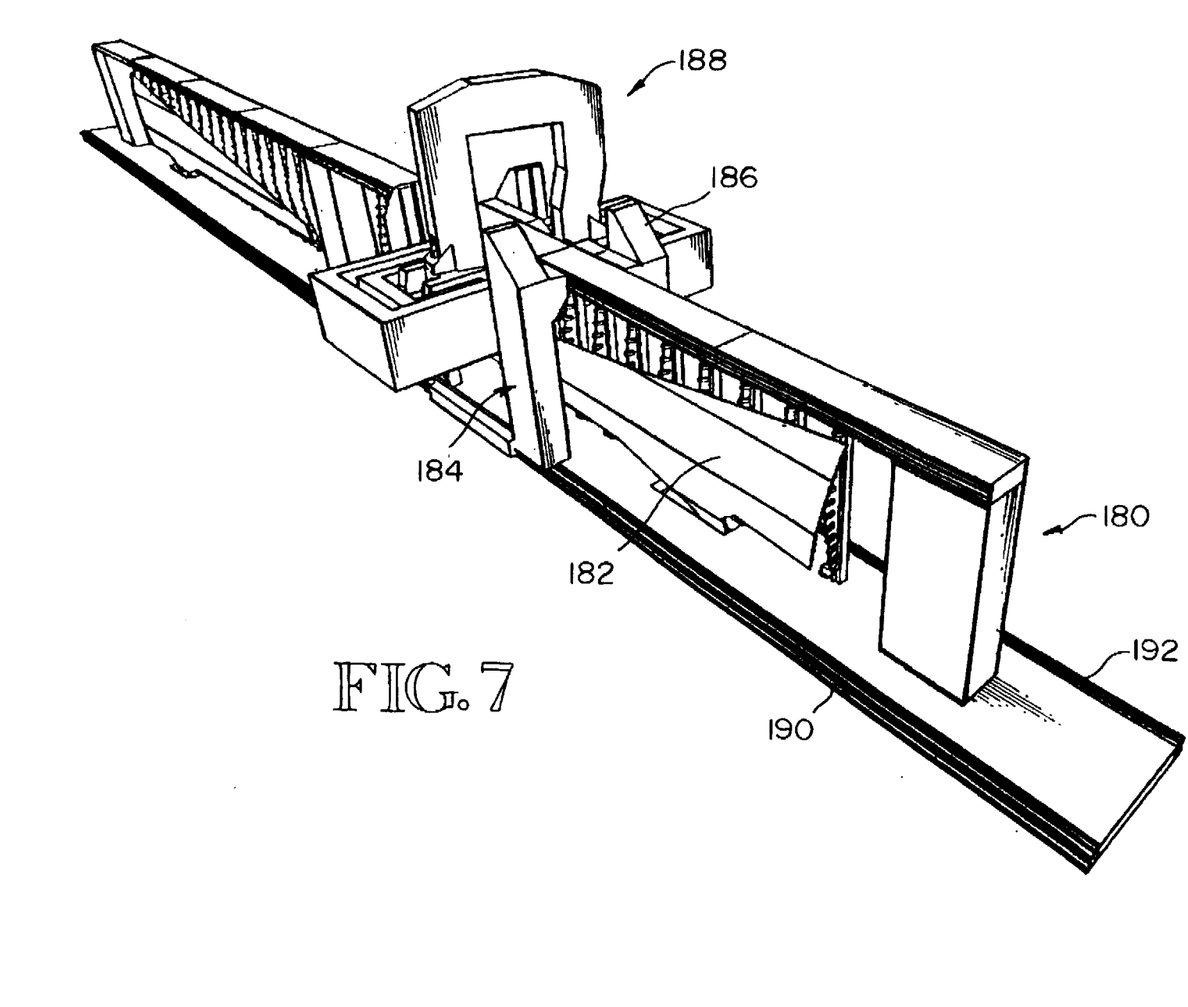
FIG. 7 is a perspective view of one embodiment of the apparatus of the present invention operating on an aircraft part, in which the apparatus is incorporated into a floor assembly jig for the part.

The present invention, such as shown generally in FIG. 1, is a yoke assembly capable of carrying out selected mechanical assembly operations on large workpieces, such as, for instance, the wings of commercial aircraft. In such an application, the mechanical assembly operations involve primarily fastening operations, in which wing skin members are stiffened by attaching thereto stringers, splice parts and other reinforcing members. This particular application is illustrated in FIG. 7. It should be understood, however, that the apparatus of the present invention may be used in other assembly applications besides aircraft wing assembly.

Still further, while the present invention is useful in accomplishing basic fastening operations, including specific mechanical steps such as the drilling of openings for the fastening devices, inserting the fastening devices, and then completing the fastening operation by upsetting an inserted rivet or by attaching a collar to an inserted bolt, it should be understood that many other mechanical assembly operations can be carried out with the present invention, depending upon the specific application and the tools provided on the yoke assembly.

The yoke assembly 10 includes a C-shaped yoke 12 which is positioned upright so that the legs 14, 16 of the yoke 12 depend vertically downwardly, the legs connected by an intermediate section 18. Yoke 12 in the embodiment shown is similar in basic structure to that shown in the '714 patent, the contents of which are hereby incorporated by reference. The C-shaped yoke, for the aircraft wing application discussed above, is quite large, although not nearly as massive as other wing assembly apparatus. Yoke 12, in an application where a wing might be 10 feet wide, will have a height of approximately 16 feet and a width of approximately 170 inches.

The legs 14, 16 and intermediate section 18 of yoke 12 will typically have a cross-sectional configuration of approximately 40 inches by 24 inches, such that the yoke will have a central opening of approximately 12 feet high by 90 inches in width. Yoke 12 is typically made of steel for strength and rigidity. However, other materials may be used, depending on the application. Also, the size and configuration of yoke 12 may be varied depending on the particular application.

At the lower, free end of each of the depending legs 14 and 16 are the assembly tools 20 and 22. The tools are frequently referred to as either skin side tools or stringer side tools, depending upon whether the tools are positioned adjacent the wing skin side or the stringer side of the part. Tools 20 and 22 could include drills, a riveting apparatus (both sides), a milling head for removing the tops of rivets, if necessary, and bolt insertion tools, including a tool for positioning a nut and/or collar on the exposed end of the inserted bolt. Other tools could, of course, be included, depending on the application.

Figure 2:
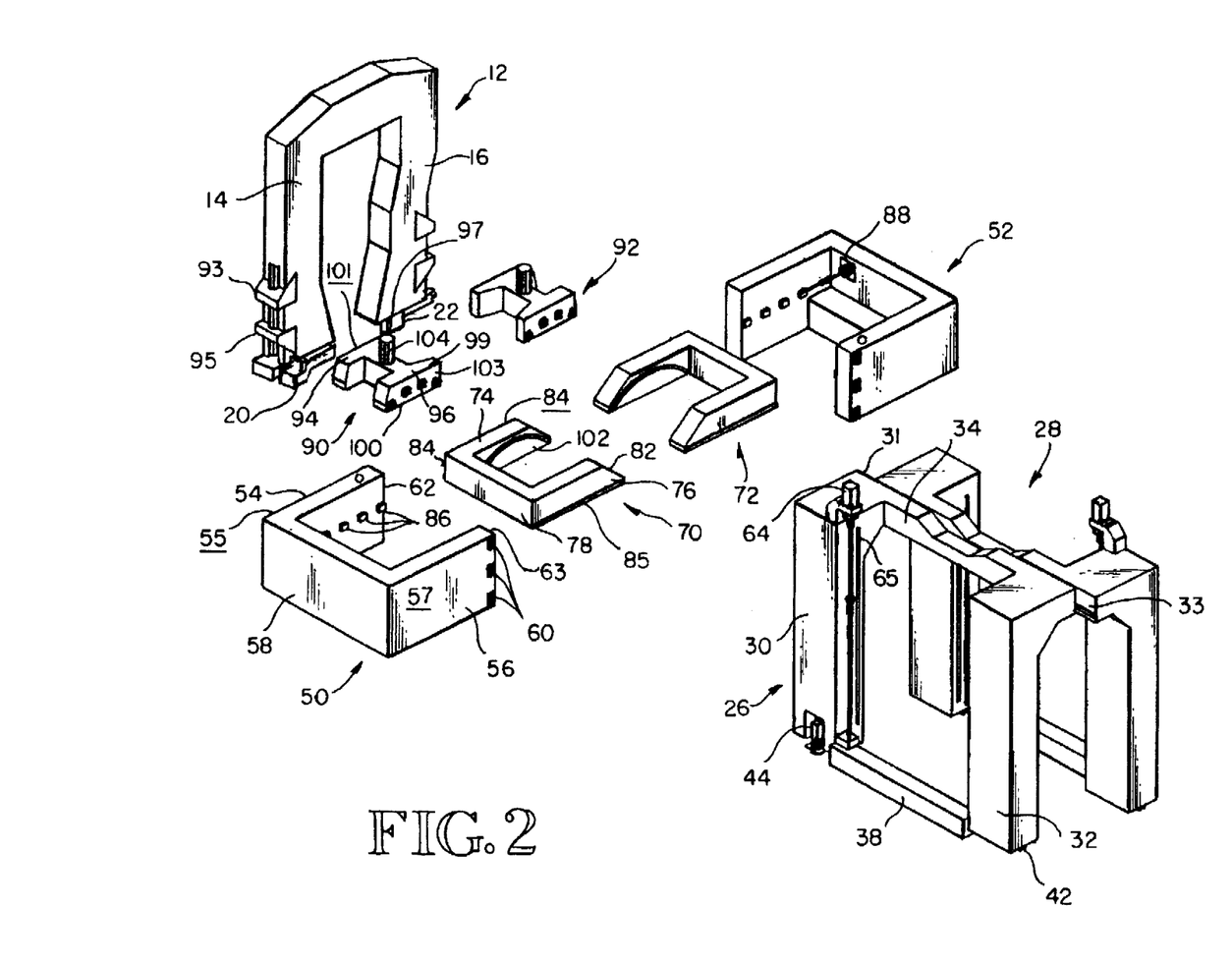
FIG. 2 is an exploded view of the arrangement of FIG. 1.

Referring to FIGS. 1 and 2 relative to the yoke assembly as a whole, two X direction support frames 26 and 28 provide movement for the yoke in the X direction. The two X frames 26 and 28 are positioned on opposing sides of the workpiece being operated on. The X frames 26 and 28 are essentially mirror images of each other. In the embodiment shown, X frames 26 and 28 are approximately 12 feet high, 12 feet wide and 6 feet deep. X frame 26 is illustrative of both frames.

X frame 26 includes two vertical portions 30 and 32 connected at the top by an upper horizontal portion 34, all made of steel, or similar material. The upper portion 34 is offset slightly inwardly from the vertical portions and extends inwardly a selected distance. X frame 28 has the same configuration, so that the respective free longitudinal edges 31, 33 of the upper portions of the two X frames are substantially immediately adjacent each other. The longitudinal edges 31, 33 mate in a sliding relationship by means of a linear bearing 36 which movably secures the two X frames 26 and 28 together, and permits them to move longitudinally, i.e. in the X direction, either together or independently. Linear bearing 36 maintains the two X frames upright and prevents them from rotating.

Extending between vertical sections 30 and 32 of X frame 26 near the lower ends thereof is a longitudinal brace 38.

Typically, X frames 26 and 28 will move longitudinally along the workpiece such as shown in FIG. 7, referred to as X direction movement, by means of floor-mounted tracks. The lower surfaces of the X frame vertical sections 30 and 32 include cooperating bearing elements 42 which mate with the tracks for movement of the frame therealong. The particular structure and arrangement of the means to move the X frames elements can take many variations and arrangements. Further, each of the X frames 26, 28 may be driven in the X direction by various means, such as a ballscrew, or a rack and pinion drive structure 44 (illustrated), or some other means.

In the arrangement shown, each X frame moves along its floor-mounted track under the control of its own drive mechanism. The two X frames are thus independently moveable. The X frames may move in unison, which results in an X direction movement for yoke 12, or they may move different distances and/or in opposing directions, resulting in a rotation of the yoke 12 about a vertical, i.e. Y axis, which is referred to herein as B direction rotation or movement. This is discussed in more detail below.

Mounted on X frames 26 and 28, respectively, are Y direction frames 50 and 52. Y direction frames 50 and 52 are identical in configuration so that they are mirror images of each other; Y frame 50 is exemplary. Y frame 50 is generally C-shaped in configuration, comprising horizontal legs 54 and 56 and an intermediate section 58. The two C-shaped Y frames are positioned so that they open toward each other inwardly of the assembly. Y frame 50 in the embodiment discussed above is approximately 8 feet long by 8 feet wide by 6 feet high. The legs 54 and 56 and intermediate section 58 are generally flat. Typically, the Y direction frames are steel or similar material.

Each leg 54 and 56 has a plurality of bearing elements 60—60 located in vertical alignment on their outer surfaces 55, 57, adjacent the free edges 62, 63 thereof. These bearing elements ride in mating vertical tracks 65 on facing surfaces of the two vertical portions of each X frame, so that the Y frame can move vertically substantially the entire height of its associated X frame. The Y frame is driven vertically by a ballscrew drive 64. Other drive means could be used.

The Y frames 50 and 52, like the X frames, can either be moved in unison, which results in a vertical movement of the yoke 12 in the Y direction, or they can be moved separately different distances or in opposite directions, which results in a rotation of the yoke about the true X axis when there is no rotation of the yoke in the B direction or about an axis normal to the plane of the yoke when there has been a rotation of the yoke in the B direction. Typically, there is only a small difference between these two axes, since rotation in B, about the Y axis, is small, typically less than 20°. Hereinafter, for ease of explanation, rotation in A will be referred to as about the X axis, even though there may be a rotation of the yoke in the B direction.

Two opposing Z direction frames 70 and 72 are mounted, respectively, on Y frames 50 and 52. The two Z axis frames are substantially identical, C-shaped in general configuration, mounted so as to open inwardly toward each other. Z frame 70 is exemplary. Z frame 70 in the embodiment shown is approximately 6 feet long by 6 feet wide by 2 feet high and includes two legs 74 and 76 and an intermediate section 78. The legs include angled surface portions 80 and 82, respectively, at the free ends thereof. In the embodiment shown, Z frame 70 is made of steel.

In the embodiment of FIG. 2, legs 74 and 76 of Z frame 70 include bearing tracks 84, 85 on an exterior surface 87, 89 thereof, near a lower edge thereof. Bearing tracks 84, 85 mate with bearing elements 86 which are mounted on the interior surfaces of the legs 54, 56 of the associated Y frame. In the embodiment shown, bearing elements 86—86 are located at approximately mid-height of the legs of the Y frame. Typically, only one of the two Z frames 70 and 72 will be positively driven, such as by a ballscrew 88 or other drive means. The opposing Z frame is passive, i.e. it is not positively driven but is free to move in the Z direction. However, it should be understood that both Z frames could be positively driven in particular circumstances; alternatively, both Z frames could be passive.

The Z frames in the embodiment of FIG. 2 provide movement for the yoke in the Z axis direction, normal to the X and Y axes, thereby providing the well-known cartesian coordinate (X, Y, Z) directions of movement. Typically, the Z axis direction will be toward and away from the workpiece. In the embodiment shown, the one Z axis ballscrew 88 could be controlled by sensors which detect the surface of the workpiece and maintain the yoke at a desired position relative to the workpiece. Alternatively, the Z frame movement could be preprogrammed relative to a particular workpiece configuration. Still further, the Z frames could in certain circumstances be fixed in position with the respective tool assemblies on the yoke being movable toward and away from each other and the workpiece, such as disclosed in the '174 patent. The Z frames and the tool assemblies could also both be movable so as to locate the tools in the Z direction relative to the part.

Mounted on Z frames 70 and 72, respectively, are two-axis pivot elements or trunnions 90 and 92. Pivot elements 90 and 92 are identical and oppose each other; trunnion 90 is exemplary for description purposes. Trunnions 90 and 92 are an important part of the embodiment shown, since they provide rotational capability for the yoke 12 in both the A and B directions. Trunnion 90 is basically H-shaped in configuration, with two side portions 94 and 96 and a central portion 98. In the embodiment shown, trunnion 90 is approximately 4 feet long by 4 feet wide by 2 feet high.

Each side portion is approximately 6 inches thick, with the inner surfaces of the proximal sections 97, 99 of the side portions tapering outwardly from the central portion to the free ends of the side portions, such that the distance between the side portions increases from the central portion to the free ends of the side portions. This configuration permits an increased maximum range of rotation of the yoke in the B direction, which in the embodiment shown is approximately ±15 degrees.

On the outer surfaces 101 and 103 of the two side portions 94, 96 are a series of bearing elements 100. These are arranged in a curved pattern, based on a radius of curvature of approximately 40 inches in the embodiment shown, although this could certainly be varied from embodiment to embodiment. Bearing elements 100 mate with a corresponding curved bearing track 102 on the inner, facing surfaces of the legs 74, 76 of the corresponding Z frame 70. Hence, trunnion 90 is capable of rotating in the A direction about the X axis in the embodiment shown. Trunnion 92 rotates similarly relative to Z frame 72. Extending through the central portion 98 of trunnion 90 is a cylindrical shaft 104, approximately 5 inches in diameter and 30 inches high in the embodiment shown.

Figure 4A:
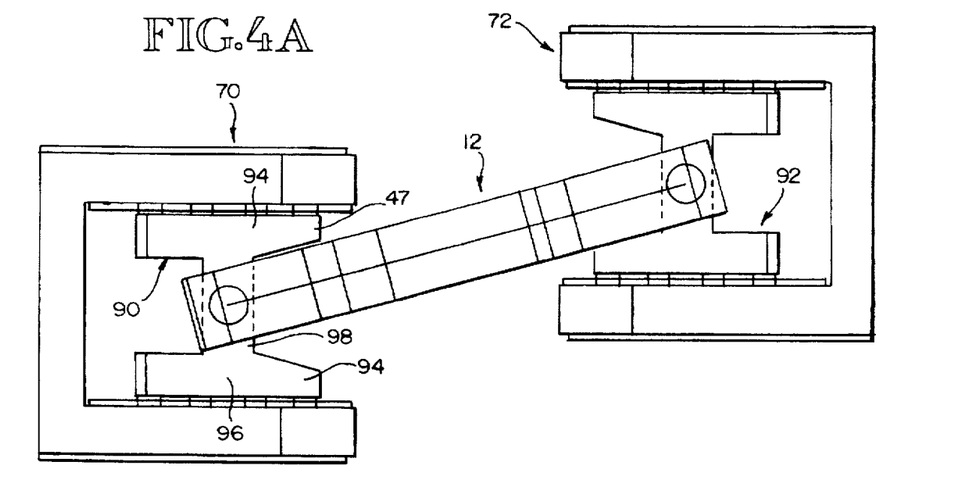
FIGS. 4A and 4B are top and side elevational views, respectively, of a portion of the structure of FIG. 1.
Figure 4B:
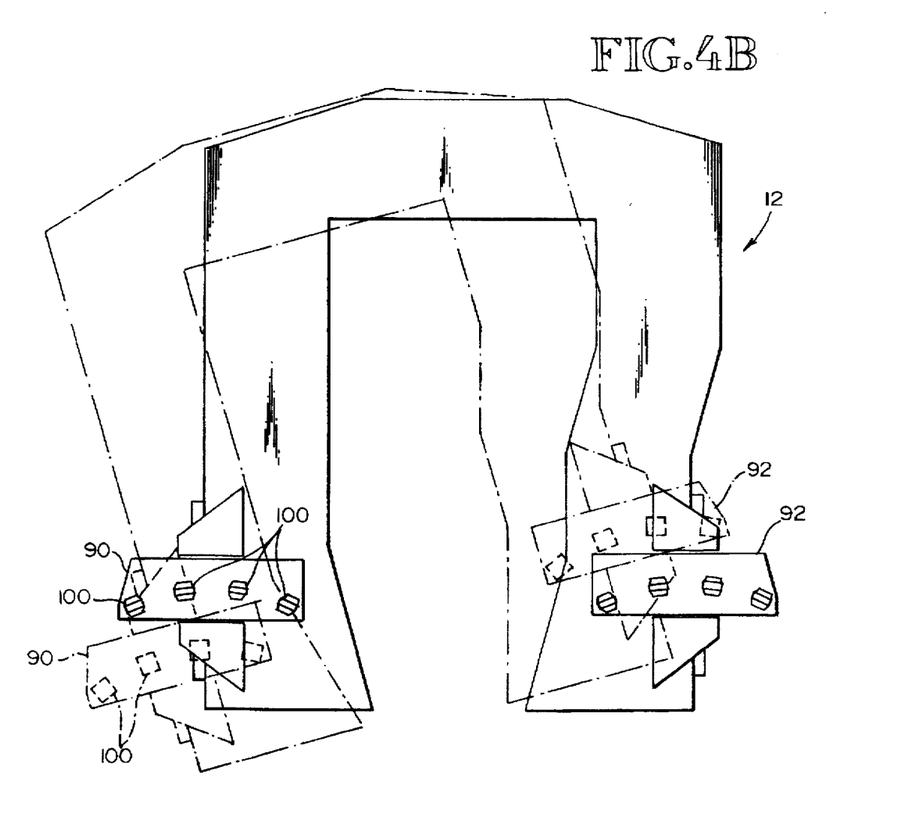

Trunnion 90 fits against the outer surface of leg 14 of the yoke between protrusions 93 and 95. The portions of the shaft 104 above and below the trunnion 90 fit into openings in the protrusions 93, 95. The yoke is thus free to rotate through a range of approximately ±15 degrees about the Y axis (in the B direction) on shaft 104. Hence, the two-axis pivot elements on trunnions 90 and 92, mounted on Z frames 70 and 72, permit movement of the yoke 12 in the A and B directions. Looking generally at FIGS. 1 and 2, the yoke is supported by two spaced two-axis trunnions, which in turn are supported on two Z frames mounted on two Y frames. The Y frames are in turn mounted on the two X frames. The yoke is positioned by the disclosed arrangement of the mounting structure approximately central of the two spaced X frames (the longitudinal, X axis dimension) of each frame. The yoke furthermore extends above the top of the mounting structure. A direction rotation of the yoke member is illustrated in FIG. 4B while B direction rotation is illustrated in FIG. 4A.

It is important to note, relative to the mounting structure, that each trunnion includes two axes of rotation for the yoke. The two spaced trunnions 90 and 92 (on opposite sides of the part) provide excellent stability and control for the yoke, yet permit movement in X, Y and Z as well as in the A and B directions. The two axes include a vertical axis which extends down the center of shaft 104 on the trunnion and a horizontal axis which extends through the imaginary centerpoint of the radius of curvature of the bearing elements 100 on the trunnion.

These two axes of rotation for each trunnion intersect at particular points in space, on opposite sides of the workpiece. In the embodiment shown, the tool point, i.e. the point at which the tool on the yoke (such as the drill) contacts the surface of the workpiece, will hence by deliberate and carefully controlled design always be on the line connecting the respective two-axis intersection points (pivot points) of the trunnions, on opposite sides of the workpiece, i.e. these three points, the two spaced axis intersection points and the tool point, will always be in registry. Hence, the location of the tool point, which is an important consideration, can always be readily ascertained by simple geometry.

Figure 6A:
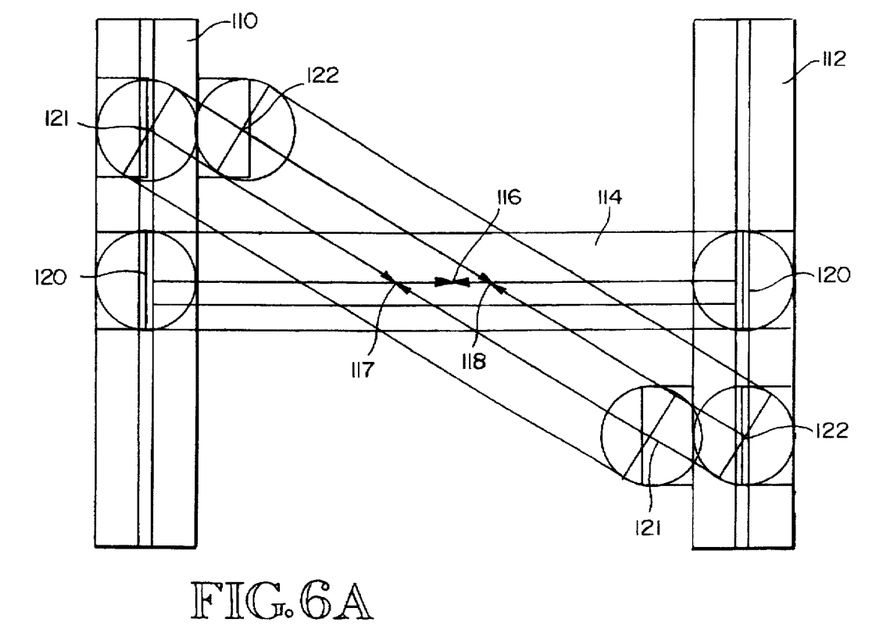
FIGS. 6A and 6B are diagrams showing yoke movement for the embodiment of FIG. 2.
Figure 6B:
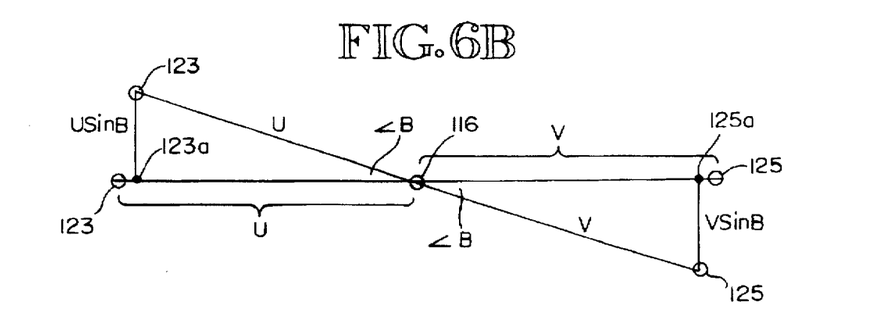

This is illustrated in FIGS. 6A and 6B. The two opposing supporting elements 110 and 112 in FIG. 6A represent the two X axis tracks, differential motion on which results in B direction rotation of the yoke, or the two Y axis tracks, differential motion on which results in A direction rotation of the yoke. Differential movement of both X and Y frames will result in movement of the yoke in both A and B directions. The yoke 114 is shown in three positions in FIG. 6A, one in which the opposing frames are coincident, and the other two in which they are not, with one Z frame being fixed in one case and the other Z frame being fixed in the other case. Points 116, 117 and 118 represent the tool point for each yoke position, while points 120, 121 and 122 represent the two-axis intersection points of the trunnions for the yoke.

FIG. 6A illustrates the movement of the yoke in either the A or B directions. In each case, however, the tool point remains in registry between the spaced two-axis intersection points of the trunnions. Again, this is important, as it means that the actual physical position in space of the tool point can be determined readily by conventional trigonometric principles, as described in more detail below.

As the X or Y frames move in opposing directions, the yoke will begin to rotate and the Z frame(s) will move or slide accordingly, as illustrated in FIG. 6A. The basic trigonometrical relationship is shown in FIG. 6B. If the tool point 116 is originally midway between the axial intersection points for the two trunnions and the two frames move an equal (but opposite) distance, the tool point will remain fixed in the X and Y dimensions, which defines the critical position for wing manufacture. The distance between the two opposing pivot points 123, 125 as the yoke rotates (in A or B) will remain the same; hence, one or both of the Z frames must move (slide) inwardly, thus shortening the Z distance (the new lateral distance between the two pivot points, 123a to 125a).

Referring to FIG. 6B, when the tool point is centered between the two pivot points, i.e. where U is equal to V, the two frames move in equal and opposite directions to provide rotation in A or B. When the tool point is not centered, the two frames move distances which are proportional to the distances between the pivot points for each frame and the tool point. In the embodiment of FIG. 2, the Z actuator 88 is used to center the tool point on the line between the two pivot points or to move it to another point on that line. The rotational movement in A, for instance, of the yoke is advantageously and simply achieved by linear movement of the Y frames, which can be accurately achieved by ball-screw means, etc. The same is true for rotation of the yoke in the B direction, by moving the X frames as described above.

The tool point is the point, as noted above, where the tool, such as a drill, will initially contact the aircraft wing panel being fastened. This will also be the location of the center-point of the head of the bolt or rivet to be installed. The arrangement shown permits accurate rotation in A or B without changing the X or Y position of the tool point. This is quite advantageous where precise location of the tool point is critical. If the curvature of the workpiece is not specified, the position of the yoke may be controlled by sensors instead of a preprogrammed control.

Figure 3:
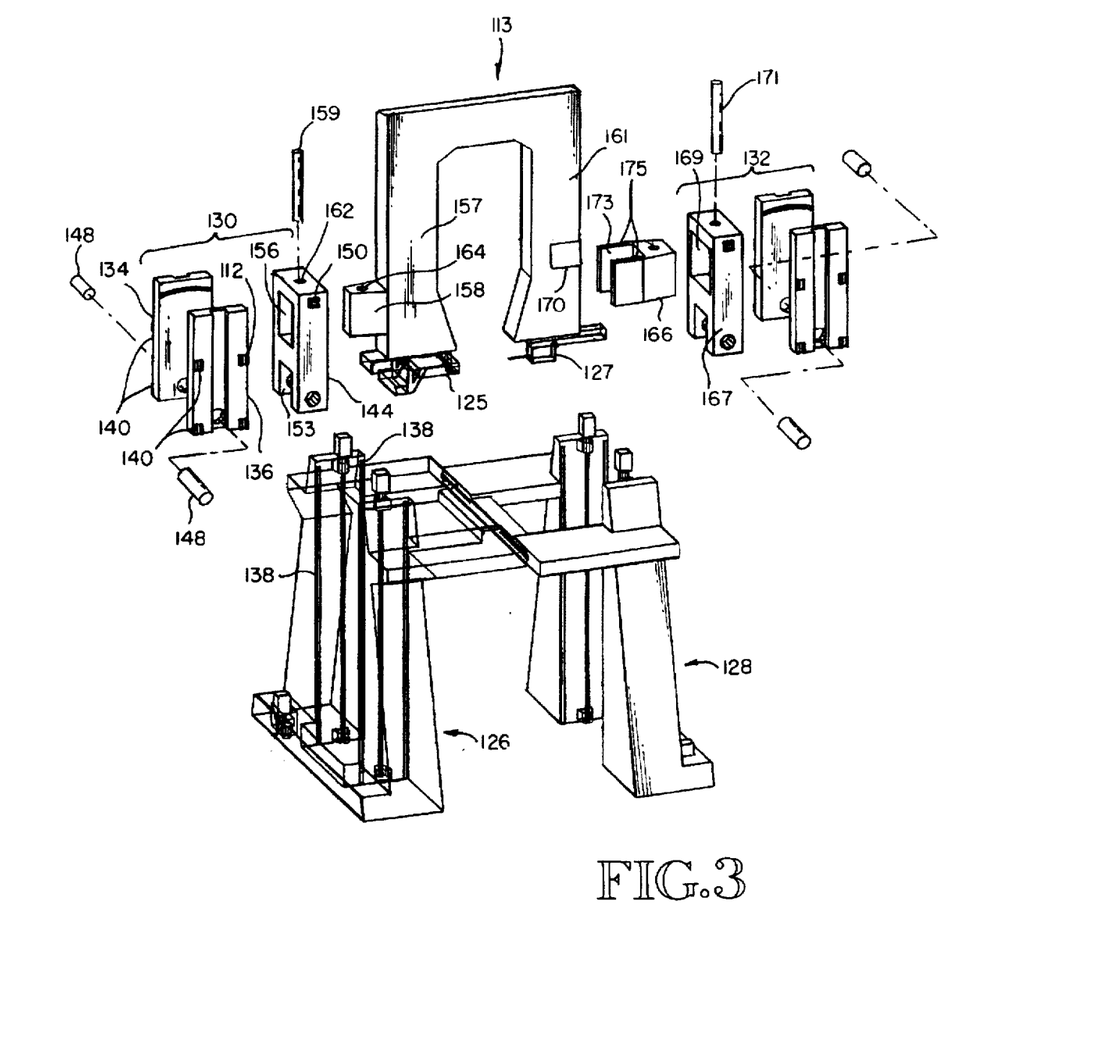
FIG. 3 is an exploded view of an alternative embodiment to that of FIG. 2.

FIG. 3 shows an embodiment of the present invention in which there are no Z frames per se for the yoke. In this embodiment, the Z distance, i.e. the lateral distance between the frames orthogonal to the X and Y axes, remains the same. Hence, the distance between the pivot points changes as the yoke rotates in the A or B direction. This is accommodated by elements in the yoke assembly which remain in-line with the yoke tool line as the yoke rotates in A or B.

Yoke 123 of FIG. 3 is generally similar to yoke 12 in FIG. 1. It includes tool assemblies 125 and 127 on the bottom of each leg. In the embodiment of FIG. 2, Z actuator 88 moves the yoke from side to side to a desired point, normally under sensor control but also under program control if desired. As the yoke position is rotated in A and B, the point of contact with the wing skin not only stays on the tool line but also stays at a fixed point on this line, such as the yoke centerpoint, by the action of actuator 88.

This is not the case for the arrangement of FIG. 3. In FIG. 3, as the yoke is rotated in A and B, the tool point stays on the tool line but shifts along this line as the yoke rotates. This is acceptable, since the tool assembly heads 125 and 127 can be moved forward or backward along the tool line to remain in a desired "standoff" contact with the wing skin. This can be accomplished by sensors or by program control.

Therefore, the desired result, i.e. rotation of the yoke in A or B without shifting the tool point contact coordinates in X and Y with the skin, is achieved in the FIG. 3 embodiment as well as the FIG. 2 embodiment.

The X direction frames 126 and 128 are substantially identical to the X direction frames of the embodiment of FIG. 2, and are mounted and configured and move relative to each other to move the yoke in the X direction. The Y direction frames 130 and 132 (frame 130 is exemplary) include a pair of opposing vertically sliding plate elements 134 and 136 and an intermediate pivoting element 144. Plate elements 134, 136 are mounted on the X direction frame 126 for vertical movement by means of tracks 138—138 on the X frame and mating bearings 140, 142 on elements 134, 136.

Pivoting element 144 is positioned between the two plate elements 134 and 136 and mounted on rod elements 148 which connect, respectively, each plate element and pivoting element 144. Pivoting element 144 includes bearings 150 on outer surfaces thereof, arranged in a curve, which mate with correspondingly curved tracks 145—145 on the inwardly facing surfaces of plate elements 134 and 136. Pivoting element 144 is hence free to rotate about rod elements 148. This permits movement (rotation) for the yoke in the A direction, about the X axis.

Member 144 in the embodiment shown includes an opening 153 at the lower end thereof, to permit tool assembly 125 to move outwardly along the tool line if necessary. Member 144 also includes an opening 156 therethrough. Extending from leg 157 of yoke 123 is an angled protrusion element 158 which fits into opening 156 and is rotationally held therein by a pin 159, in a clevis-like arrangement. Pin 159 extends vertically down through opening 162 in the pivoting element 144 and a mating opening 164 in element 158. This arrangement permits rotation in the B direction of the yoke as element 158 rotates about pin 159.

The clevis arrangement for the other leg 161 is somewhat different, as element 166 is rotatable relative to element 167 in opening 169 about pin 171. Element 166 includes a U-shaped portion 173 into which leg 161 of the yoke fits. Element 166, however, is not a part of yoke leg 161. Yoke leg 161 moves relative to element 166 (into and out of U-shaped portion 173 thereof) by means of bearing elements 170 on yoke leg 161 and mating tracks 175 on the upper edges of the U-shaped portion of element 166. Hence, as the yoke is moved in the B direction (about the Y axis), by linear movement of the X frames, clevis elements 158 and 166 rotate with the yoke, and remain in the same plane as the yoke. The yoke, however, will move (slide) relative to clevis element 166 by means of the bearing/track arrangement 170, 175. This sliding movement is thus "in line" with the yoke tool line, instead of orthogonal to the X and Y axes. The orthogonal Z distance does not change.

Figure 5A:
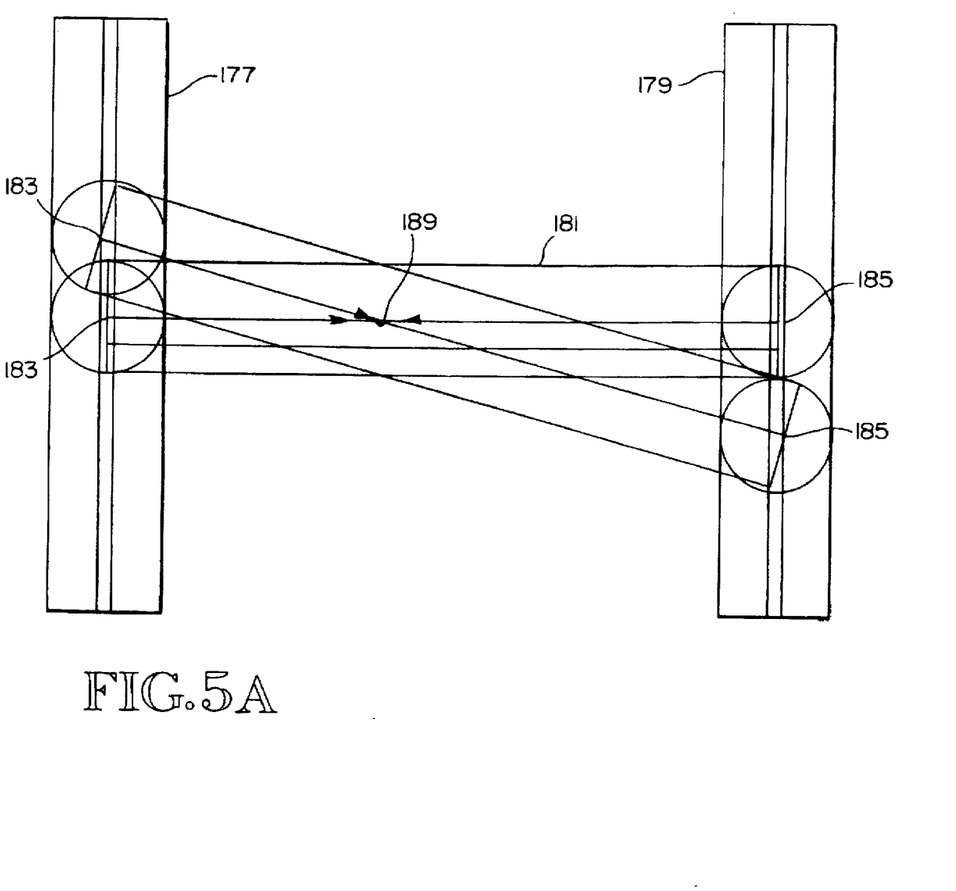
FIGS. 5A and 5B are diagrams showing yoke movement for the embodiment of FIG. 3.
Figure 5B:
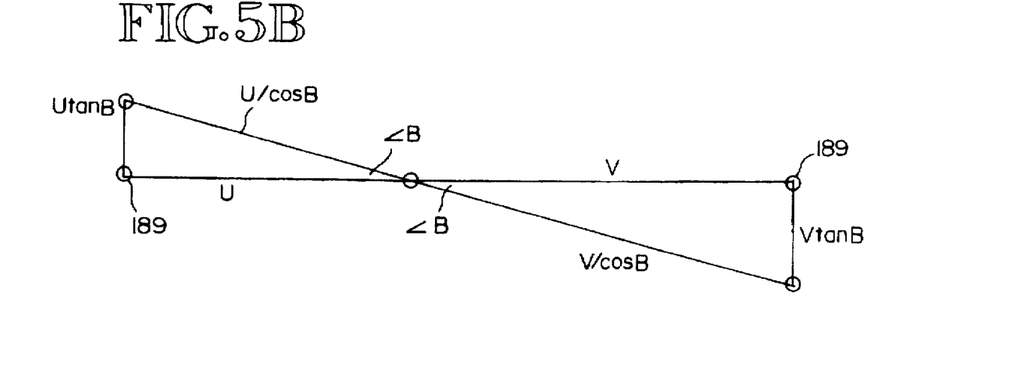

The geometry of this arrangement is somewhat different from that of FIG. 2, as can be seen in FIGS. 5A and 5B, which show the rotation of the yoke in the A or B directions. FIG. 5A shows, for X or Y frame track directions 177, 179, that when the yoke rotates in A or B, the distance between the pivot points 183, 185 increases (in line with the yoke) while the lateral distance (the orthogonal Z distance) between the X frames or the Y frames does not change. The two-axis pivot point in this embodiment is the intersection between the imaginary axes of rotation extending through the imaginary crossing point of rod elements 148 and pin 159, respectively. By careful design and alignment, the two pivot points will be in registry with the tool point 189.

Referring to FIG. 5B, when the two X frames are moved in opposite directions to adjust the B rotation, there is no coupling to the X position of the yoke, as long as the movement of the frames is proportional to the distances U and V, the lateral distances to the tool point, and hence the workpiece. This proportional movement is readily achieved with conventional controls. In addition, the Y position of the yoke will not change in such a case.

Again, as shown in FIG. 5A, the distance between the pivot points becomes longer as the yoke rotates in A or B. In the orthogonal arrangement of FIG. 2, the distance between the pivot points remains the same. There may in some cases be some advantage to the embodiment of FIG. 3, because of a greater ease of movement for the yoke in the Z direction. In addition, the one Z axis drive of FIG. 2 is eliminated. The key feature of the dual spaced trunnion supported yoke remains, however, providing desired stability and control for the apparatus.

If the tool point is initially centered between the two pivot points, then to rotate the yoke in A or B and maintain the X-Y position of the tool point requires an equal and opposite movement of the two X frames or Y frames and movement of the tool assembly head 125 along the tool line accordingly, usually under sensor control. If the tool point is initially not centered between the two pivot points, the ratiometric relationship of the distances from the tool point to the respective two-axis pivot points on opposing sides of the yoke determines the correct amount of linear movement of the respective X or Y frames. The tool head is then moved along the tool line appropriately to maintain the desired X-Y position of the tool point.

Hence, for both embodiments, when the tool point is initially centered between the two pivot points, the two frames are moved in equal and opposite directions, while when the tool point is initially off-center, the two frames are moved ratiometrically. However, the tool head must be moved along the tool line in the FIG. 3 embodiment to maintain the X-Y tool point position. FIGS. 6B and 5B show the different trigonometry involved in the required calculations for the two embodiments. In each case, however, the calculations necessary to maintain the X-Y position of the tool point are simple and straightforward.

In the orthogonal arrangement of FIG. 2, the distance (U+V) between the pivot points does not change as the yoke rotates. In the in-line arrangement of FIG. 3, the trigonometric relationships are different because it is the distance (U/cos B+V/cos B) between the pivot points which changes as the yoke rotates (the hypotenuses of the triangles in FIG. 5B), while the lateral distance (U+V) remains the same (side adjacent). The linear distance to be traveled by the X or Y frames in each case can be calculated by knowing U and V, which are readily ascertainable by sensors or program control.

Hence, in summary, for both of the embodiments of FIGS. 2 and 3 to move the yoke in the X direction, joint movement of the two X frames is required. To move the yoke in the Y direction, joint movement of the Y frames is required. To rotate the yoke in the A direction requires differential movement of the Y frames, in opposite directions. To maintain the tool point in X and Y during rotation in A depends upon moving the Y frames particular amounts, depending upon the initial position of the tool point between the two pivot points, in accordance with the trigonometric relationships shown in FIGS. 5B and 6B. The same is true of rotation of the yoke in B. With the embodiment of FIG. 3, the tool point must also be moved along the tool line a selected amount to maintain the original X-Y position of the tool point.

As indicated above, the significant advantage of the above structure results partially from the mechanical design that fixes the two spaced pivot points and the tool point to remain in registry during rotation of the yoke in the A and B directions. Simple trigonometry then readily reveals the necessary linear movement of the X or Y frames to maintain the position of the tool point in the X and Y directions. This is an important advantage for the system of the present invention.

Hence, a rotation of the yoke without translation of the tool point is achievable in both A and B directions with the present invention. This rotation can be accomplished relative to a single point, i.e. the tool point, which is typically indicated to be at the intersection of the drill with the workpiece. The tool point is the point where the drill will initially contact the workpiece and will be the centerpoint of the head of the bolt or rivet which is to be installed.

FIG. 7 shows a variation of the arrangement of the present invention in position relative to a floor assembly jig (FAJ) 180, which is shown supporting a wing structure 182. The two X frames 184, 186 in the yoke assembly 188 run in tracks 190, 192 along each edge of the FAJ 180. Alternatively, the yoke assembly of the present invention could be independent of the FAJ structure itself.

Figure 8:
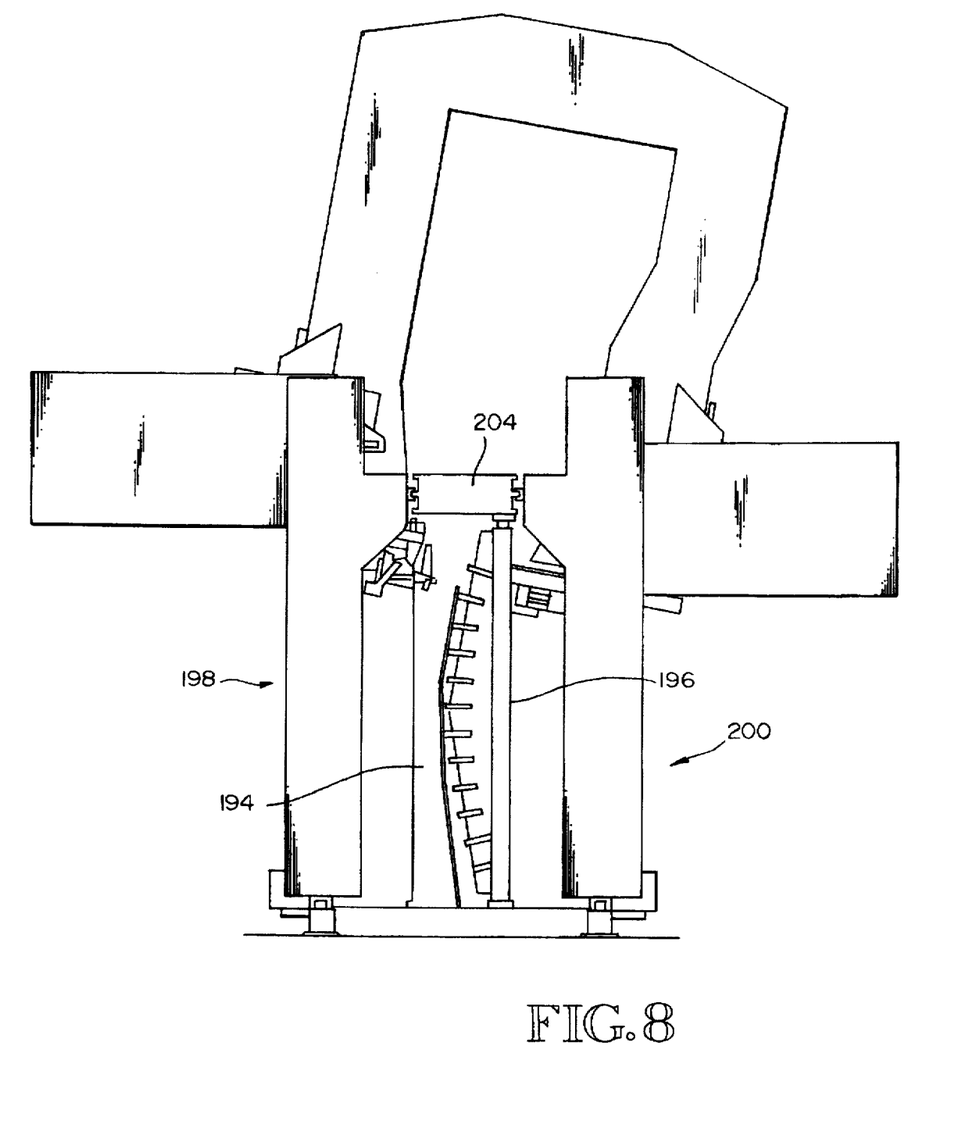
FIG. 8 is an end elevational view of the embodiment of FIG. 1, where the yoke is rotated in the A direction.

FIG. 8 shows an end view of FIG. 7 alternative embodiment in which the apparatus of the present invention is actually mounted on and attached to a floor assembly jig. The wing component 194 is shown supported by a jig structure 196. The two X frames 198 and 200 in the yoke assembly are mounted to an upper element 204 located at the top of the FAJ. Upper element 204 has bearing tracks extending along each side edge thereof, which mate with corresponding bearing elements in each X frame. One advantage to this arrangement is that the yoke itself does not require additional overhead to permit the two X frames to join together above the jig structure, as is the case with the embodiment of FIG. 2. In the arrangement of FIG. 8, a yoke of given size and length can reach lower on the wing than the embodiment which is independent of the FAJ. In the embodiment of FIG. 8, however, the upper part of the FAJ may be wider than otherwise, which reduces the yoke's range of rotation. This is undesirable in certain circumstances; an alternative might be to join the X frames over the top of the FAJ upper beam or to build a frame member which spans behind the legs of the yoke.

It should be understood that the above embodiments could be modified to the extent of eliminating a capability of rotational movement in the A direction. The B axis rotation points on the opposing sides of the yoke should still be on the tool line to provide simple trigonometric calculations for the tool point. In this arrangement, the Y frames are eliminated as a separate element, but the yoke includes elements connecting both legs to the X frames so that the yoke can still move in the Y direction. The separate, linear motion of the X frames will still produce the desired rotation in B, as with the other embodiments. It is important, however, that in all of the embodiments, rotary action of the yoke, whether in A or B or both is accomplished by linear motion of the X and Y frames, which is precise and easy to control. The linear motion may be accomplished by drive means such as ball screws or the like, as explained above.

Although a preferred embodiment of the present invention has been disclosed for illustration, it should be understood that various changes, modifications and substitutions may be incorporated in such embodiment without departing from the spirit of the invention as defined by the claims which follow.

I claim:

1. A yoke assembly system for large-scale part assembly, comprising:

a yoke member comprising two depending leg portions and an intermediate portion;

tool means for accomplishing assembly operations secured to the depending leg portions of the yoke, wherein the tool means defines a tool point for contact with a work piece being assembled; and means supporting each leg of the yoke member at separate pivot points such that the yoke member moves longitudinally in an X axis direction and vertically in a Y axis direction which is orthogonal to the X axis direction, and rotates substantially about at least one of: the Y axis and (b) the X axis.

2. An apparatus of claim 1, wherein said pivot points and said tool point remain substantially in alignment during movement of the yoke.

3. An apparatus of claim 1, including means for rotating the yoke member about both the Y axis and the X axis.

4. An apparatus of claim 1, further including means permitting the yoke member to move in a Z axis direction, wherein the Z axis direction is orthogonal to the X and Y axis directions.

5. An apparatus of claim 4, including means for moving the yoke member in the Z axis direction.

6. An apparatus of claim 1, wherein the supporting means is arranged and constructed to permit a change in the distance between said pivot points as the yoke member rotates.

7. An apparatus of claim 1, wherein the supporting means is arranged and constructed so that the distance between said pivot points does not change as the yoke member rotates.

8. An apparatus of claim 1, wherein the supporting means is independent of any assembly jig structure for the workpiece being assembled.

9. An apparatus of claim 1, including means for mounting the support means on an assembly jig structure for the part being assembled, for movement of the yoke member therealong.

10. An apparatus of claim 1, wherein the means for moving the yoke member in the X axis direction includes two opposing X frame members, supported and driven for both independent and joint movement, wherein when the X frames are moved differentially, rotation of the yoke about the Y axis results.

11. An apparatus of claim 10, wherein said means for moving the yoke member in the Y axis direction includes two opposing Y frame members mounted, respectively, on the X frame members for movement thereon in the Y axis direction, wherein differential movement of the Y frame members results in rotation of the yoke substantially about the X axis.

12. A yoke assembly system for large scale part assembly, comprising:

a yoke member comprising two depending leg portions and an intermediate portion;

tool means for accomplishing assembly operations, secured to the depending leg portions of the yoke member, wherein the tool means are arranged to define a tool point for contact with the part being assembled;

means for supporting the two leg portions of the yoke member for movement thereof in an X axis coordinate direction, wherein the X direction moving means includes first and second support frames which support the two leg portions, respectively, on opposite sides of the part, wherein a width dimension of each support frame extends along the X axis, and means joining said first and second frames, arranged to permit relative movement thereof, wherein each of said first and second frames are capable of moving independently in the X direction; and means for supporting the yoke member from movement thereof in a Y axis coordinate direction, wherein the Y axis coordinate direction is orthogonal to the X axis coordinate direction, wherein the yoke member is supported approximately central of the width dimension of each support frame, respectively, and wherein the supporting means for movement of the yoke member in the X and Y coordinate directions are mounted relative to each other such that the yoke can be rotated substantially about at least one of: (a) the Y axis and (b) the X axis.

13. An apparatus of claim 12, wherein each leg of the yoke is supported at separate pivot points and wherein said two pivot points and said tool point remain substantially in alignment during movement of the yoke member.

14. An apparatus of claim 12, including means for rotating the yoke member about both the Y axis and the X axis.

15. An apparatus of claim 12, wherein the Y direction moving means includes third and fourth support frames mounted on, respectively, the first and second support frames.

16. An apparatus of claim 12, wherein the first and second frames are mounted so as to move jointly and differentially, wherein differential movement of the first and second frames results in rotation of the yoke member about the Y axis.

17. An apparatus of claim 15, wherein the third and fourth frames are mounted so as to move jointly and differentially, wherein differential movement of the third and fourth frames results in rotation of the yoke member about the X axis.

18. An apparatus of claim 12, wherein the said joining means includes bearing means located at upper ends of the first and second frames, permitting sliding movement of the first and second frames relative to each other.

19. An apparatus of claim 15 including means for moving the first and second frames and the third and fourth frames linearly to achieve rotation of the yoke member.

20. An apparatus of claim 12, wherein the yoke member supporting means is independent of any assembly jig structure for the part being assembled.

21. An apparatus of claim 12, including means for mounting the yoke member supporting means on an assembly jig structure for the part being assembled, for movement of the yoke member therealong.

* * * * *